Figure 1:
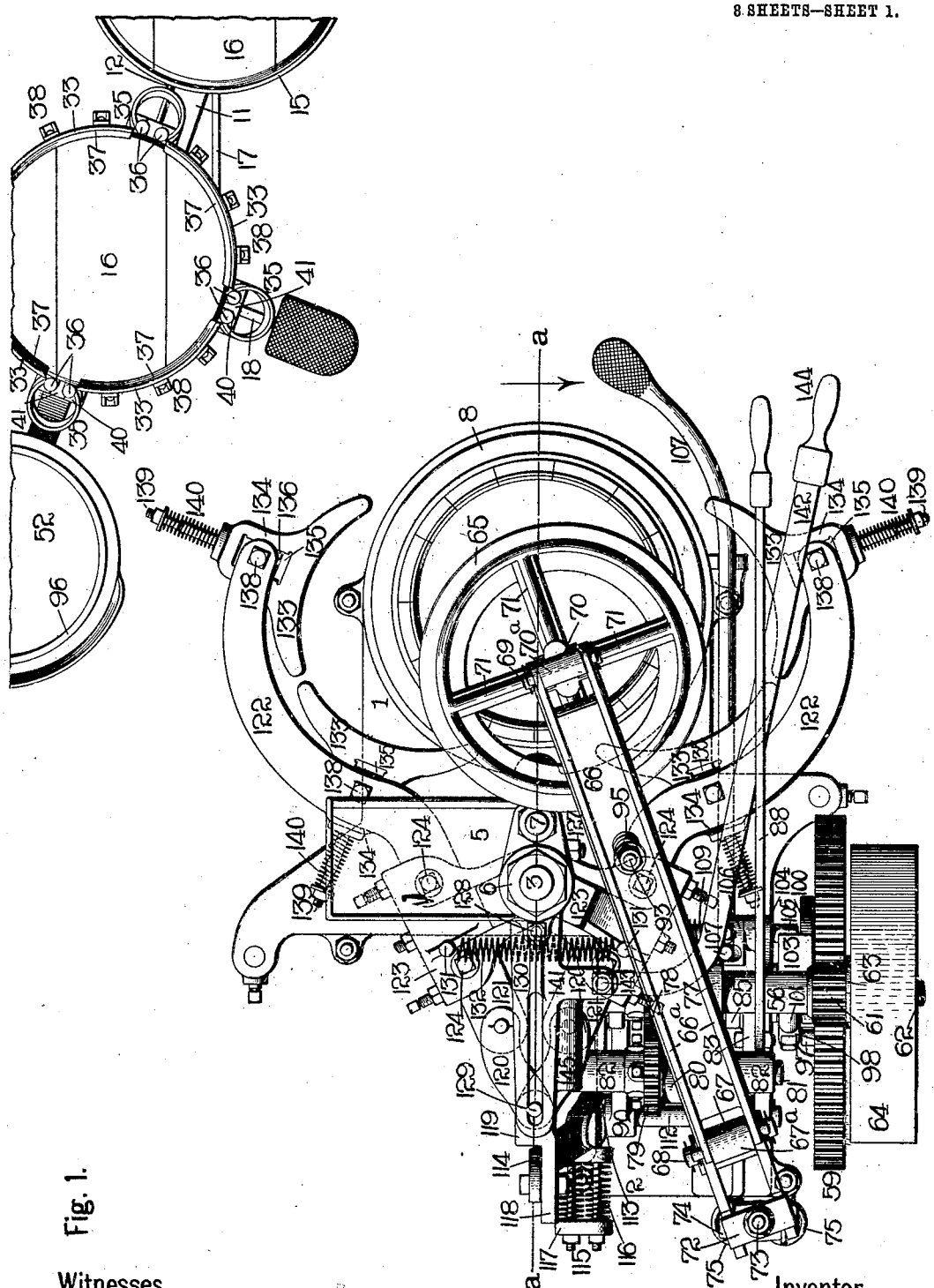

E. F. BEUGLER.
MACHINE FOR HEADING UP BARRELS.
APPLICATION FILED MAR. 28, 1907.
946,714.
Patented Jan. 18, 1910.
8 SHEETS—SHEET 2.
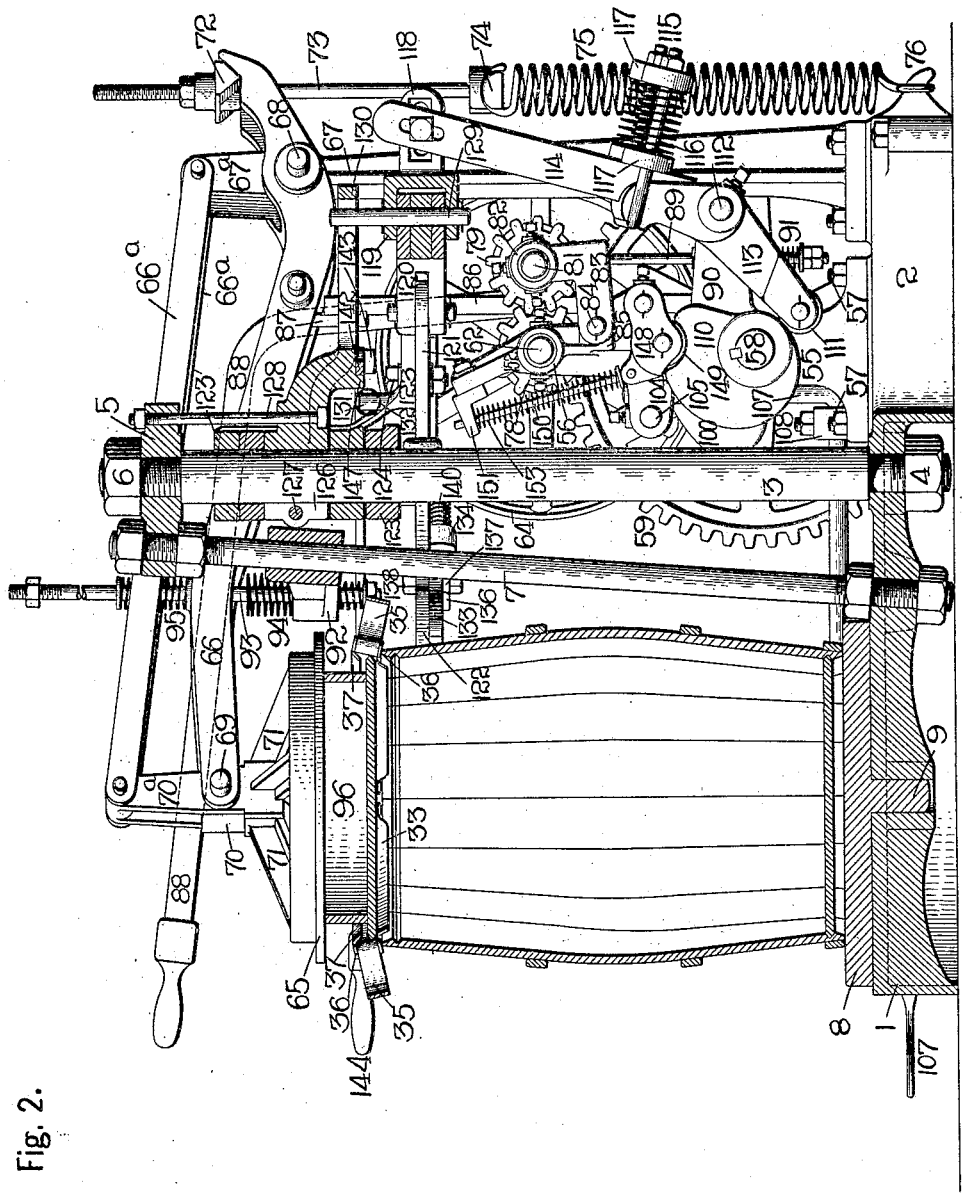
Fig. 2.
Witnesses.
L. M. Baugster
George A. Neubauer.
Edwin F. Beugler, Inventor.
By 
Attorney.

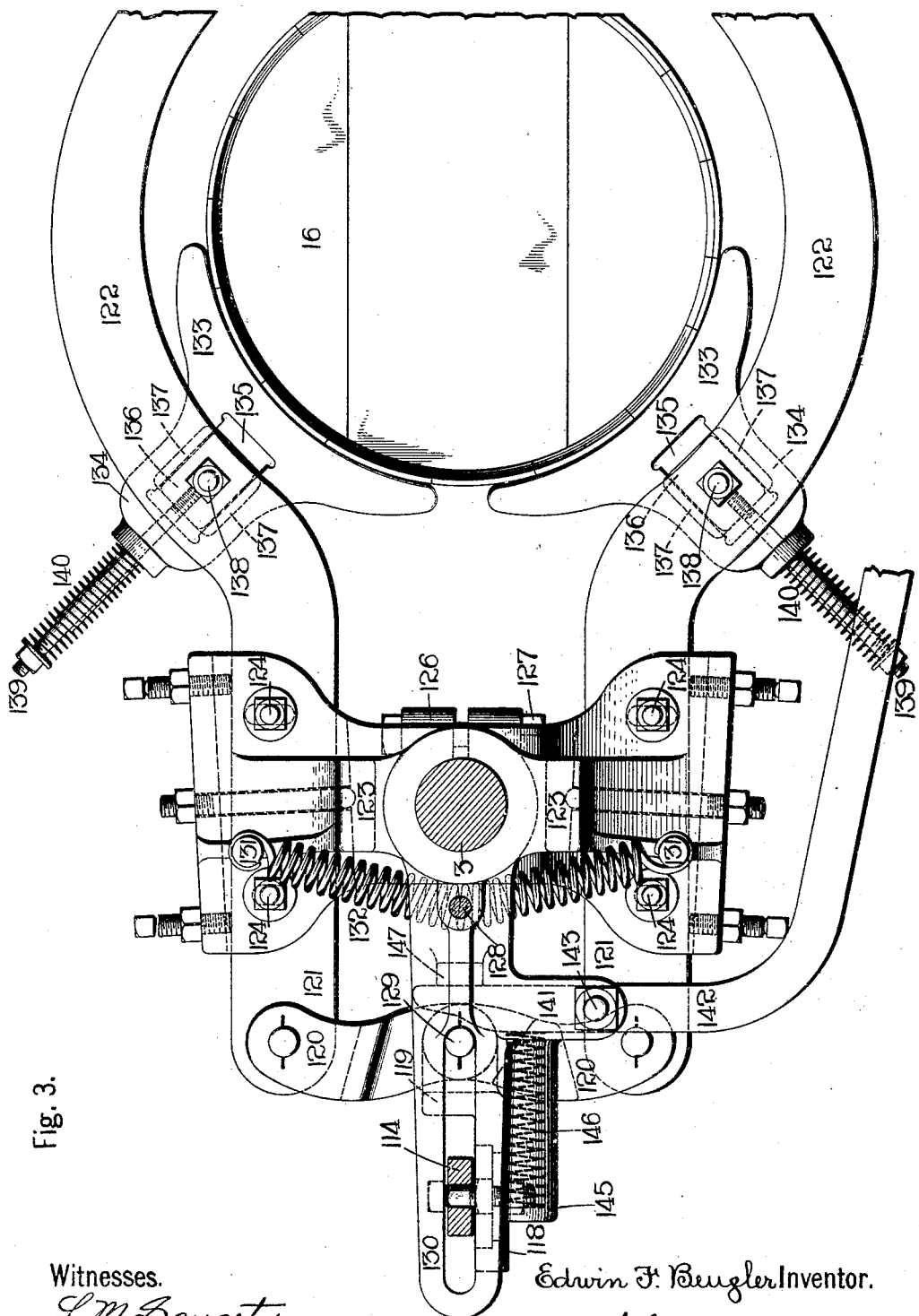

E. F. BEUGLER.
MACHINE FOR HEADING UP BARRELS.
APPLICATION FILED MAR. 28, 1907.
946,714.
Patented Jan. 18, 1910.
8 SHEETS—SHEET 4.
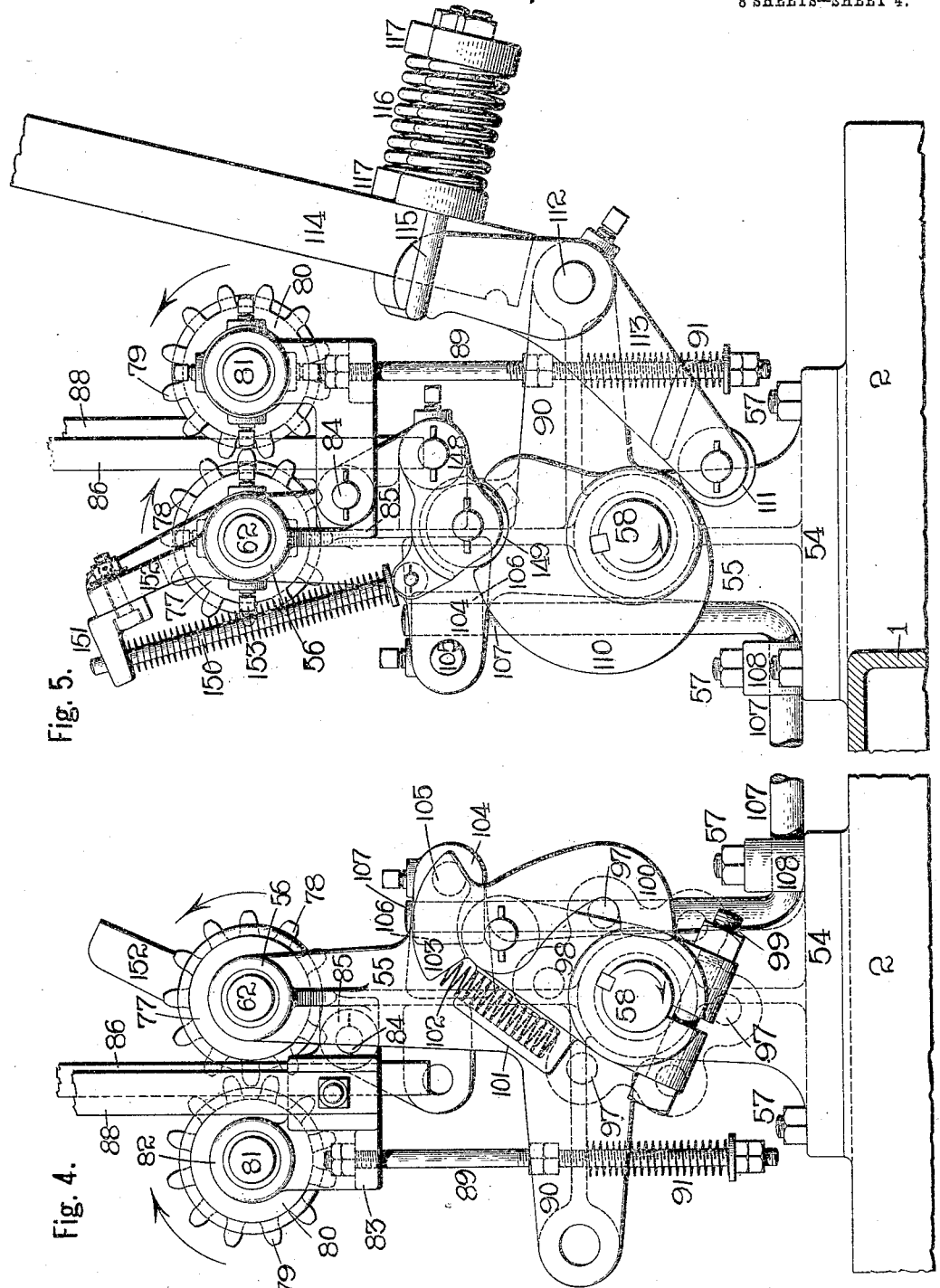
Witnesses.
L. M. Sangster.
George A. Neubauer.
Edwin F. Beugler, Inventor.
By C. J. Sangster
Attorney.

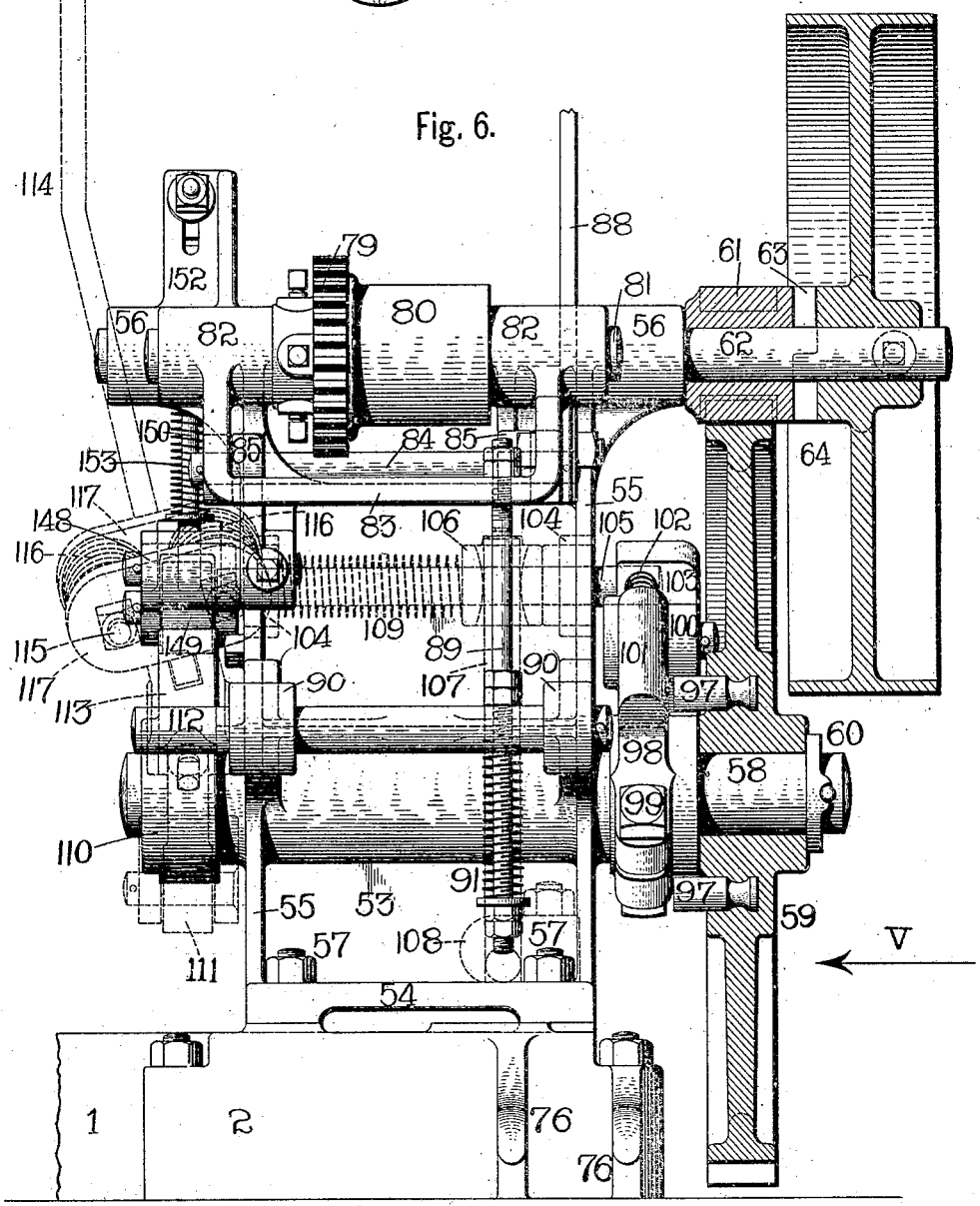

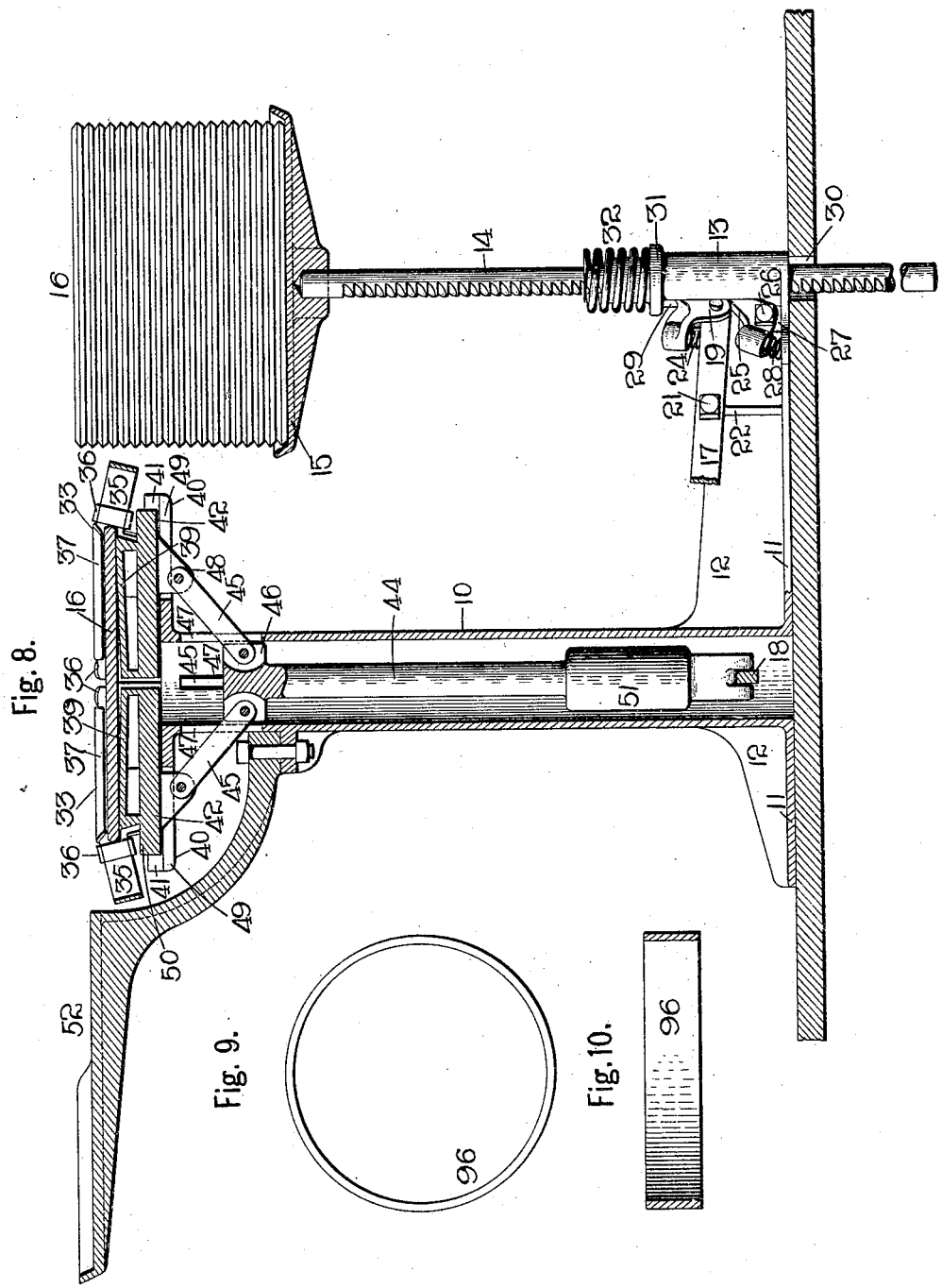

E. F. BEUGLER.
MACHINE FOR HEADING UP BARRELS.
APPLICATION FILED MAR. 28, 1907.
946,714.
Patented Jan. 18, 1910.
8 SHEETS—SHEET 7.
Fig. 11.
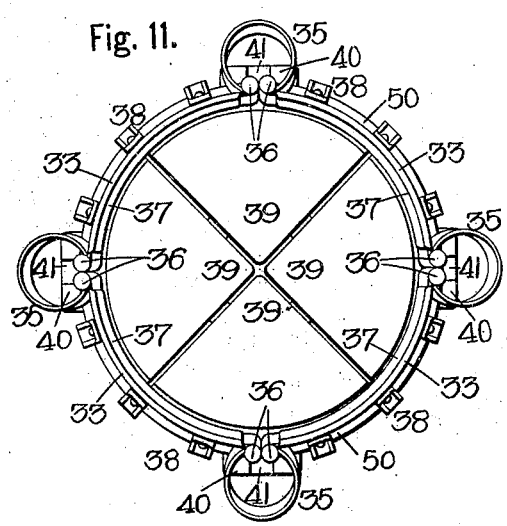
Fig. 12.
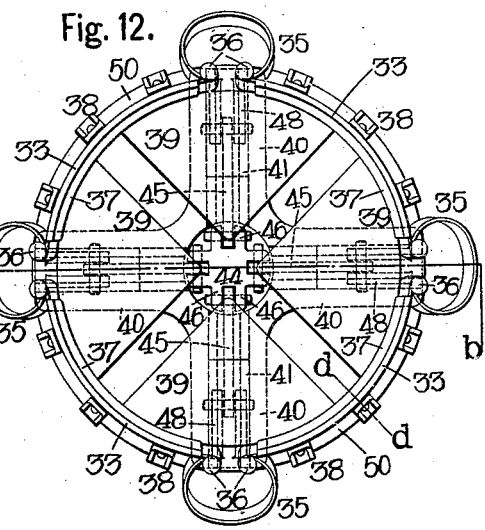
Fig. 13.
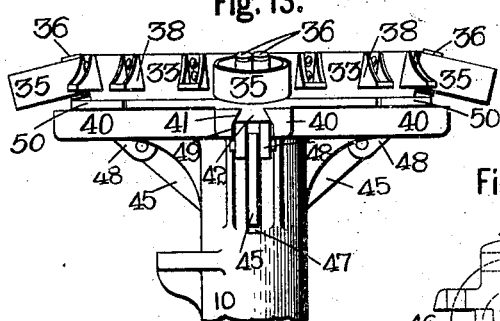
Fig. 14.
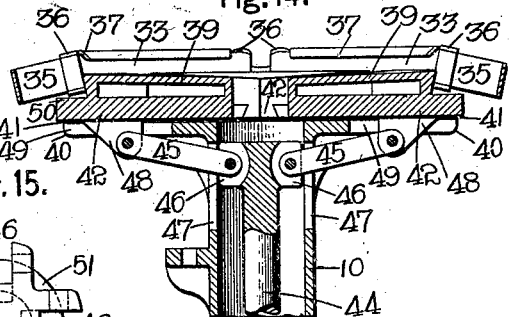
Fig. 15.
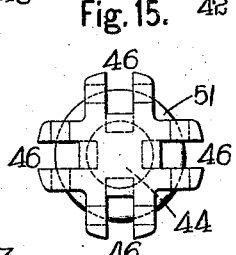
Fig. 16.
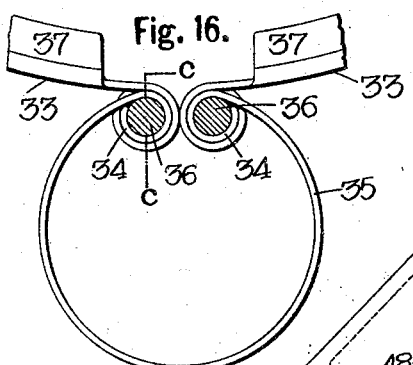
Fig. 17.
Fig. 18.
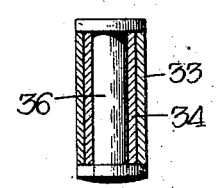
Fig. 19.
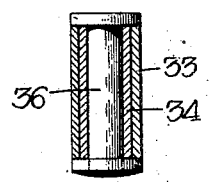
Witnesses.
L. M. Saugster.
George A. Neubauer.
Inventor.
Edwin F. Beugler.
By C. J. Saugster
Attorney E. F. BEUGLER.
MACHINE FOR HEADING UP BARRELS.
APPLICATION FILED MAR. 28, 1907.
946,714.
Patented Jan. 18, 1910.
8 SHEETS—SHEET 8.
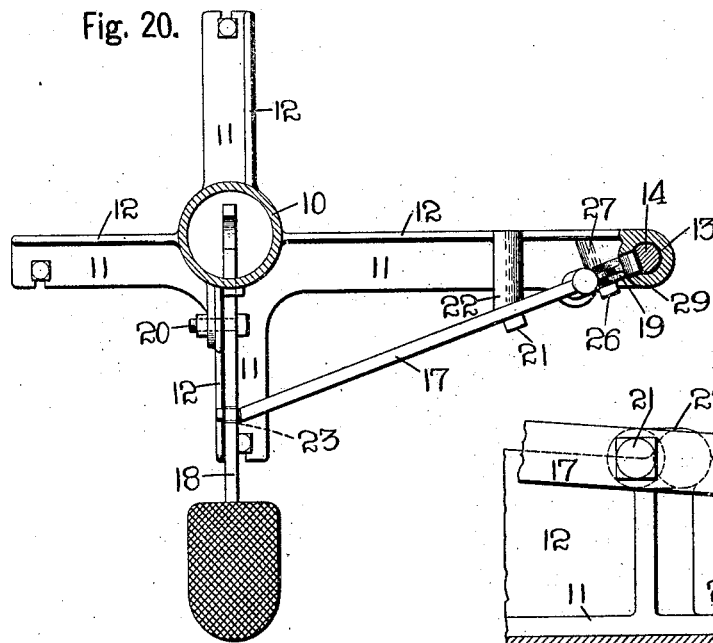
Fig. 20.
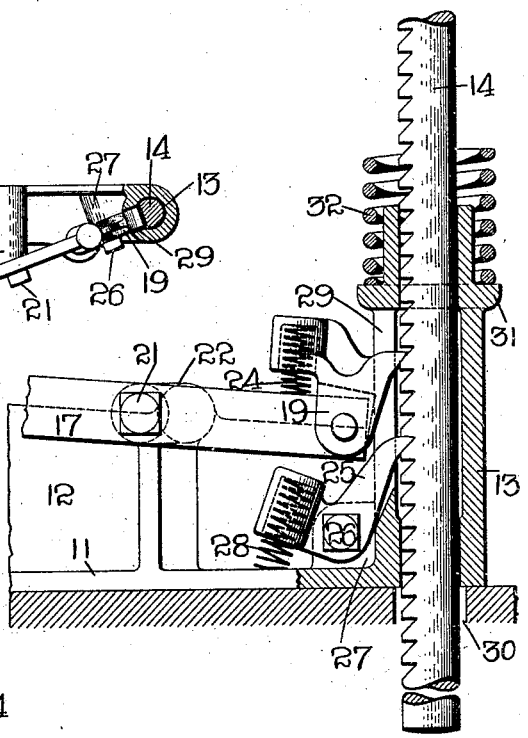
Fig. 21.
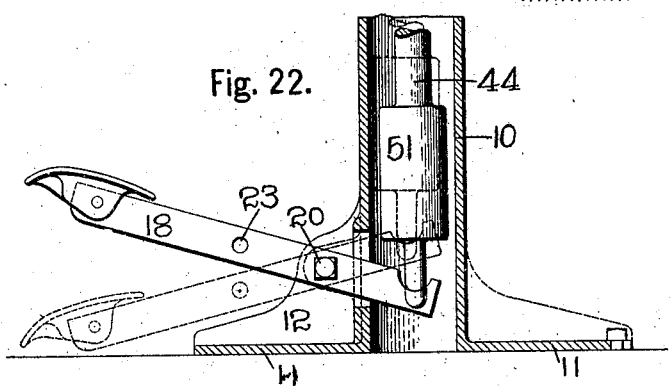
Fig. 22.
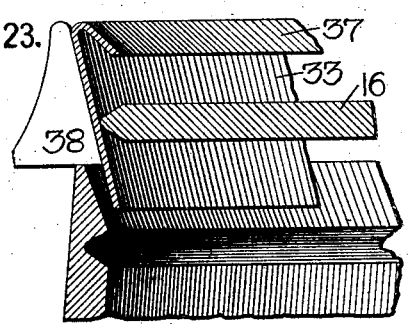
Fig. 23.
Fig. 24.
Witnesses.
L. M. Sangster
George A. Neubauer
Inventor.
Edwin F. Beugler
By A. J. Sawpste
Attorney.

UNITED STATES PATENT OFFICE.

EDWIN F. BEUGLER, OF BUFFALO, NEW YORK, ASSIGNOR TO EDWARD B. HOLMES, OF BUFFALO, NEW YORK.

MACHINE FOR HEADING UP BARRELS.

946,714.   Specification of Letters Patent.   Patented Jan. 18, 1910.

Application filed March 28, 1907. Serial No. 365,138.

*To all whom it may concern:*

Be it known that I, EDWIN F. BEUGLER, a citizen of the United States, residing at Buffalo, in the county of Erie and State of New York, have invented a certain new and useful Improvement in Machines for Heading Up Barrels, of which the following is a specification.

This invention relates to an improved barrel heading up machine, and the object of the invention is to produce a machine capable of being operated at a high speed that will insert the head in a barrel and then compress the staves and drive home the end hoop.

One feature of the invention has reference to a novel head feeding device which feeds the heads in a vertical direction, so that a head is always within convenient reach of the operator.

Another feature of the invention has reference to a novel expansible head holder which holds the pieces of the barrel head in assembled form while it is being conveyed from the feeder to the barrel, and also supports it vertically above the open end of the barrel until it is driven home.

The invention also relates to certain details of construction, all of which will be fully and clearly hereinafter described and claimed, reference being had to the accompanying drawings in which,—

Figure 1 is a top plan view of the improved barrel heading up machine, the mechanism being in its normal inoperative position and a portion of the heading feeder being broken away. Fig. 2 is a central vertical section on line *a a* Fig. 1, showing the head holding ring in position on a barrel and the mechanism in position to drive the head into the barrel end. Fig. 3 is an enlarged detached fragmentary top plan view of the barrel stave compressing mechanism, showing it in closed position around a barrel, a cross section being taken through the vertical bar and through the rocking lever. Fig. 4 is an enlarged detached side view of the vertical bracket showing the friction pulleys and the clutch mechanism for rotating the lower shaft, looking in the direction of the arrow V Fig. 6. Fig. 5 is an enlarged detached side view of the vertical bracket showing the friction pulleys, and the cam mechanism for closing the compressor arms, looking in the opposite direction to the arrow V, Fig. 6. Fig. 6 is an enlarged detached rear elevation of the vertical bracket and the mechanism mounted thereon, a section being taken through the driving pulley and the intermeshing gearing. Fig. 7 is a detached view of the driving pinion. Fig. 8 is an enlarged detached central vertical section through the heading feeder and expanding table. Fig. 9 is an enlarged detached plan view of the head driving ring. Fig. 10 is a transverse section through the same. Fig. 11 is a detached top plan view of the expansible head holding ring in position on the expanding table, the ring and the expanding table being in their normal contracted condition. Fig. 12 is a view similar to Fig. 11, showing the table and ring expanded. Fig. 13 is a fragmentary side view of the table and ring in the position shown in Fig. 11. Fig. 14 is a section on line *b b*, Fig. 12. Fig. 15 is an enlarged detached top plan view of the weighted bar within the hollow standard of the expanding table. Fig. 16 is an enlarged fragmentary view of the expansible head holding ring, showing one of the springs, a transverse section being taken through the fastening rivets. Fig. 17 is an enlarged detached top plan view of one of the sliding sections of the expanding table. Fig. 18 is a section on line *c c*, Fig. 16. Fig. 19 is an enlarged transverse section through the expansible ring on line *d d*, Fig. 12, showing the manner of riveting the supporting lugs thereon. Fig. 20 is a transverse section through the hollow standard of the expanding table and through the lower tubular portion of the heading feeder, showing a plan view of the mechanism for elevating the heading. Fig. 21 is an enlarged detached fragmentary central vertical section through the lower portion of the heading feeder, showing a side view of the mechanism for elevating the heading. Fig. 22 is a fragmentary central vertical section through the base and the hollow standard of the expanding table showing the weighted bar and foot lever for operating same. Fig. 23 is an enlarged fragmentary vertical section through a barrel, showing the expansible head holding ring in place and holding a head ready to be driven into the end of the barrel. Fig. 24 is a view similar to Fig. 23, showing the head driven into the end of the barrel and engaging with the croze, the barrel staves not yet being compressed.

In referring to the accompanying drawings for the details of construction, like numerals designate like parts.

The base of the machine shown in Figs. 1 and 2, is composed of a main portion 1, and a rearward extension 2. A vertical bar 3, has its lower end passed through an opening near the rear edge of the main portion 1, of the base and is rigidly secured in place by a nut 4. The upper end of the bar 3, is reduced and passed through an opening in a horizontal plate 5, and a nut 6, is screwed thereon to secure the plate in position. An oblique brace bar 7, has its extremities screw threaded and passed through openings in the base portion 1, and in the horizontal plate 5, and is rigidly fastened in place by opposed nuts, see Fig. 2. The openings in the plate 5, are located near one edge so that the plate extends almost entirely to one side of the bars 3 and 7, see Fig. 1.

A barrel supporting plate 8 is preferably placed upon the base portion 1, as shown in Fig. 2. This plate 8, is circular in form and has a central depending pin 9, which enters a vertical opening in the base portion 1, to prevent involuntary displacement thereof. Plates of various thicknesses are provided to be used with barrels of varying heights, so that the top edge of the barrel will always be approximately the same distance from the base of the machine. The barrel is placed upon the plate in the position shown in Figs. 1 and 2.

The heading feeder is located at one side of the machine and within convenient reach of the operator, see Fig. 1. It consists of a vertically moving heading support and an expanding table for expanding the head holding ring. In the following description reference will be had to Figs. 1, 8, 11, 12, 13, 14, 15, 17, 20, 21 and 22, where this portion of the machine is shown.

The expanding table is supported by a hollow standard 10, which is provided at its lower end with oppositely extending feet 11, preferably four in number, through which bolts are passed to secure the standard rigidly to the floor. The feet 11, are provided with strengthening ribs or webs 12, see Figs. 8, 20, 21 and 22. One of the feet 11, is considerably longer than the others and terminates at its outer extremity in a vertical tubular portion 13, through which the toothed bar 14, of the heading feeder passes, see 8 and 21. A circular plate 15, is secured to the upper end of the toothed bar 14, upon which the heading 16, is stacked in the manner shown in Figs. 1 and 8. The heading is elevated by means of a lever 17, connected at one end to a foot lever 18, and having a lifting dog 19, at its other end which engages with the teeth on the bar 14. The foot lever 18, is pivoted by a bolt 20, to the web 12, of one of the feet 11, extending at approximately right angles to the elongated foot 11, which carries the tubular portion 13. The inner extremity of the foot lever 18, passes through a slot in the hollow standard 10, into the interior thereof as shown in Fig. 22. The lever 17, is pivoted by a bolt 21, to a lug 22, on the foot 11, near the tubular portion 13, and extends in an oblique direction from the tubular portion to the foot lever 18. The end of the longer portion of the lever 17, is reduced and fitted through a circular opening 23, in the foot lever as shown in Fig. 20. The lifting dog 19, is pivoted by a pin to the extremity of the shorter end of the lever 17, and engages with the teeth on the toothed bar 14, being normally maintained in engagement therewith by a coiled spring 24, seated in a pocket in the dog, and bearing against the top surface of the lever. Another dog 25, is pivoted by a bolt 26, to a lug 27, on the tubular portion 13, so as to be directly beneath the lifting dog 19, and engages with the toothed bar 14, in the manner shown in Fig. 21. This dog 25, is maintained in engagement with the teeth by a coiled spring 28, and normally prevents the downward movement of the toothed bar. The tubular portion 13, is provided with a vertical slot 29, through which the dogs 19, and 25, pass to engage the toothed bar, see Figs. 8, 20, and 21. An opening 30, is bored in the floor beneath the tubular portion 13, through which the toothed bar passes, see Figs. 8 and 21. An annular flange 31, is formed on the tubular portion 13, near its upper end and supports a coiled compression spring 32. The purpose of this spring is to relieve the jar when the heading plate 15, is dropped after the supply of heading is exhausted.

It will be noted by referring to Fig. 8, that the pitch of the teeth on the bar 14, is about equal to the thickness of the heading so that the heading plate 15, is elevated a distance equal to the thickness of one barrel head every time the foot lever 18, is depressed. In this manner the top of the stack of heading is maintained at about the same level. When the supply of heading has been exhausted, the supporting plate 15, is given a half turn which turns the toothed bar 14, and brings the teeth thereon out of engagement with the dogs 19 and 25, thereby permitting the bar and plate to drop. The plate is then given another half turn and the teeth brought into engagement with the dogs.

The barrel head is held in assembled form within an expansible holding ring while it is conveyed from the heading feeder to the barrel. This expansible holding ring and the table for expanding it are illustrated in Figs. 1 and 8, and particularly in Figs. 11 to 19 inclusive. The expansible holding ring is composed of a plurality of curved steel sections which are secured together in circular form by spring connections. In the preferred construction as illustrated in the accompanying drawings, four of these curved steel sections 33, are employed, all of which are of approximately the same shape and size. The sections 33, are assembled in circular form and fastened together by bending the ends thereof around the eyes 34, at the extremities of circular springs 35, made of flat steel plates. These circular springs 35, are equal in number to the number of curved sections comprising the ring. The curved sections and circular springs are fastened together by rivets 36, which pass through the eyes 34, of the circular springs in the manner shown in Figs. 16 and 18. Each of the curved sections 33, has a flange 37, at its upper edge which projects inwardly and obliquely downward, see Figs. 8, 14 and 19, and which terminates near its ends, see Fig. 16. The curved sections 33, taper inwardly from top to bottom so that when assembled in circular form, the ring formed thereby is of smaller diameter at the bottom than at the top, see Figs. 2, 8 and 14. The oblique inwardly projecting flanges 37, on the curved sections 33, serve not only to strengthen and stiffen the same, but also prevent the upward passage of a head through the ring after the ring has contracted around it, see Fig. 8. A series of lugs 38, having flat bottom surfaces are fastened by rivets to the outer surface of the curved sections 33, and serve to support the ring in the open end of a barrel, as shown in Figs. 23 and 24.

The table for expanding the head holding ring is mounted at the upper end of the tubular standard 10, and is composed of a plurality of slidable sectors 39, which are adapted to be moved radially at the will of the operator to enlarge the diameter of the table.

The upper end of the tubular standard 10, is provided with a plurality of horizontal arms 40, which project radially from the standard and extend in opposite directions from the sides thereof, see Fig. 12. Each of the horizontal arms 40, has a longitudinal groove or slideway 41, formed in its top surface and each sector 39, has a tongue 42, on its bottom surface which is adapted to fit and slide in the groove or slideway 41, in one of the horizontal arms. In the preferred construction, four sections are used, as shown in Fig. 11. The tongue 42, and groove or slideway 41, are formed so as to dovetail into one another so that the sector will not be displaced from the arm 40, by any upward pressure thereon, see Fig. 13.

The sectors 39, are moved radially from the center of the table to expand the head holding ring by a downward movement of the foot lever 18, which is connected with the sectors by a vertical bar 44, and a plurality of radiating links 45, see Figs. 8 and 14. This vertical bar 44, is housed within the hollow standard 10, and has its lower end forked and in engagement with the inner end of the foot lever 18, see Fig. 22. At the upper end of the vertical bar 44, are four sets of split lugs 46, placed oppositely to each other, to which the inner ends of the links 45, are pivoted by pins. The links 45, pass through vertical slots 47, in the hollow standard 10, and are pivoted by pins at their outer ends to lugs 48, which depend from the bottom surfaces of the tongues 42 on the sectors 39, see Fig. 14. The portions of the arms 40 below the slideways 41 are slotted as shown at 49 in Figs. 8 and 14, to provide space for the movement of lugs 48. The peripheral edges of the sectors 39, are tapered inwardly to about the same degree as the head holding ring, and are provided with peripheral flanges 50 upon which the expansible ring rests, see Figs. 8, 11, 12, 13 and 14. The vertical bar 44 is provided with a weight 51, preferably cast integral therewith and which serves to return the sectors to their normal contracted position when the foot lever is released.

A plate 52, is bolted to the hollow standard 10, and serves as a shelf upon which the head holding ring or the head driving ring may be placed when not in use.

The mechanism for driving the head into place is supported upon the rear extension 2 of the base and is illustrated in Figs. 1, 2, 4, 5, 6 and 7 to which reference will be had to the accompanying drawings.

A bracket 53, having a horizontal base 54, and vertical end portions 55 which terminate in bearings 56, is secured to the rear extension 2 of the base by bolts 57. A transversely extending horizontal main shaft 58 is journaled in a bearing which is formed in the main portion of the bracket 53, the ends of the shaft extending beyond the bearing at each end. A large spur wheel 59 is supported upon the outer end of the shaft 58, so as to rotate independently thereof, the spur wheel being held in place by a collar 60, which is secured upon the shaft end by a pin driven therethrough. The spur wheel 59 meshes with a pinion 61, mounted upon a transversely extending horizontal driving shaft 62, which is journaled in the bearings 56, vertically above the main shaft 58. The pinion 61, has two laterally extending lugs 63, which engage with similar lateral lugs formed upon the hub of the driving pulley 64. The driving pulley is secured to the shaft by a set screw see Fig. 6. The head is driven into the barrel by means of a driving plate 65 carried at the forward end of a long arm 66 which is pivoted near its rear end to a standard 67, see Fig. 2. The standard is bolted to the base extension 2, in the rear of the bracket 53, and the arm 66 which is forked at its rear end, is pivoted to the standard by a pin 68. The driving plate 65 is pivoted to the front end of the arm 66 by a pin 69 which passes through the central hub 70 of the plate. This hub is connected to the rim of the plate by arms 71, see Fig. 2. Two parallel arms 66ª are pivoted to the upper ends of vertical extensions 67ª and 70ª on the standard 67, and on the hub 70 of the plate 65. The pivoting points of these parallel arms are at equal distances above the pivoting points of the plate 65 and the arm 66, see Fig. 2, so that the driving face of the plate 65 is always horizontal. This insures an even blow upon the head driving ring and upon the hoop, and obviates the possibility of the driving plate striking the head driving ring at one point only and driving the head into the barrel unevenly. The rear ends of the arm 66 which extend beyond the standard 67, have V-shaped notches in their top edges and a block 72 having V-shaped bottom edges is seated in these notches as shown in Fig. 2. A rod 73 passes through a vertical opening in this block 72 and carries a clip 74 at its lower end. Two heavy extension springs 75 have their upper ends secured to this clip 74, and their lower ends hooked over two rearwardly projecting lugs 76 on the rear extension 2 of the base. The springs are tensioned by means of a nut screwed upon the rod 73 above the block 72. The arm 66 is drawn down to bring the driving plate 65 into contact with the head driving ring by a set of friction rollers which engage with a friction board depending from the arm. The friction roller 77 is mounted upon the driving shaft 62 the roller having a finger gear wheel 78 formed integral therewith. The finger gear 78 meshes with a similar gear 79 having a friction roller 80 attached and which is mounted on a shaft 81. This shaft is supported in bearings 82 on a swinging bracket 83, which is pivoted by a rod 84 to lugs 85, extending from the vertical portion 55 of the bracket 53. A friction board 86 depends from the long arm 66 and passes between the friction rollers 77 and 80. The upper end of the board is fastened by a bolt to a block 87 which is pivoted by a pin to the arm 66, see Fig. 2. The swinging bracket 83 is moved to grip the friction board 86 between the rollers 77 and 80 by means of a lever 88. The rear end of this lever is fastened to the swinging bracket by a bolt and then curves up and over the top of the machine and then extends forward to within convenient reach of the operator, see Fig. 2. A rod 89 depends from the swinging bracket and passes through a rib on one of the rearwardly projecting bearings 90 extending from the bracket 53. A coiled spring 91 encircles the lower end of the rod 89 and serves to normally keep the roller 80 disengaged from the friction board.

A buffer device for the head and end hoop driving mechanism is provided which consists of an arm 92, secured to the brace rod 7 and having a depression in its outer end. A rod 93 passes through the outer end of the arm 92 and through an opening in the arm 66. A coiled spring 94 is seated in the depression in the arm 92 and a coiled spring 95 encircles the rod above the arm 66. These springs act as buffers to cushion the blow at the end of the swinging movement of the arm. A flat steel ring 96 is placed upon the barrel head in the manner shown in Fig. 2 and receives the blow from the descending driving plate 65.

After the head has been driven into place, the barrel staves are compressed to permit the end hoop to be placed thereon. The stave compressing mechanism is illustrated in Figs. 1 to 6 inclusive.

As before stated, the spur wheel 59 is loosely mounted upon the main shaft 58, so as to rotate independently thereof, and is locked to the shaft at certain intervals by a clutch device so as to rotate the shaft. This clutch device is illustrated particularly in Fig. 4. The spur wheel 59 has a comparatively large hub from which a series of short pins 97 project at equal distances from the center of the hub and from each other. These pins 97 are preferably made of steel and are embedded in the hub when the casting is made and they project from the side nearest the bracket 53, see Fig. 6. A crank 98 is fastened by a key and clamping bolt 99 to the shaft 58, between the spur wheel and the bracket 53 and said crank 98 has a clutching hook 100 pivoted to its outer end by a pin which extends through the crank and the hook. This hook 100 is adapted to engage with one of the pins 97 when the spur wheel revolves, and as the crank is securely keyed to the shaft, rotates the shaft. The crank 98 has a lug 101 formed thereon and said lug has a pocket in which a coiled spring 102 is seated. The outer end of the spring seats against a lug 103 formed upon the upper end of the hook 100 and tends to throw the hook into engagement with one of the pins 97. The clutch device is operated by means of a foot lever which extends to within convenient reach of the operator.

A lug 104 projects from the front edge of each of the vertical end portions 55 of the bracket 53 and a horizontally extending rod 105 is slidably supported in the lugs 104. One end of the rod 105 projects beyond the lug 104 adjacent to the clutch device and is adapted to catch against or engage with one edge of the lug 103 on the hook 100, see Figs. 1 and 6. A block 106 is fastened by a set screw to the rod 105 between the bearing lugs 104 and said block has a vertical opening formed therein as shown in dotted lines in Fig. 6. An angular foot lever 107 has its rear end bent upward substantially at right angles and its upper extremity passed loosely through the opening in the block 106. The remaining portion of the foot lever 107 extends horizontally forward and curves to follow the contour of the front end of the base 1, thereby forming a crank. The front extremity of the foot lever is flattened and serrated to form a convenient foot treadle for the operator, see Fig. 1. A bearing block 108 is bolted to the horizontal portion 54, of the bracket and forms a bearing for the rear end of the foot lever 107, see Figs. 4, 5 and 6. A coiled spring 109 encircles the rod 105 between the block 106 and one of the lugs 104 and serves to normally keep the end of the rod in engagement with the hook 100, see Fig. 6. The operation of this portion of the machine is as follows:—The pulley 64 is rotating continuously thereby rotating the driving shaft 62, and through the pinion 61, rotating the spur wheel 59, which is loosely mounted upon the main shaft 58. The operator wishing to start the machine, steps upon the front end of the foot lever 107 which is really a crank and depresses it, thereby rocking the horizontal portion of the foot lever. This causes the vertical rear portion of the foot lever to rock which by means of the block 106 slides back the bar 105. This permits the hook 100 to drop, being assisted by the coiled spring 102, and engage with one of the pins 97 which are rotating with the spur gear 59. The hook catches around one of the pins as shown in Fig. 4, and the hook 100 and crank 98, are thus locked to the spur wheel and revolve with it, thereby rotating the shaft 58 and starting the machine. When the machine has started, the operator releases the foot lever, thereby permitting the spring 109 to return the bar 105 to its normal position. The main shaft makes one revolution and as the hook 100 comes around, the lug 103 strikes against the end of the rod 105 thereby releasing the hook 100 from the pin 97 and stopping the machine.

The other end of the main shaft 58, carries a cam 110 which engages with a roller 111 at the lower end of the rocking lever secured to one end of a rocking shaft 112. This shaft is journaled in the rearwardly extending bearings 90 as shown in Fig. 5. The rocking lever is composed of two members, a lower member 113 which is secured to the rock shaft and carries the roller 111, and an upper member 114 which has its lower end seated in a slot in the lower member 113 and is secured thereto by a U bolt 115. Coiled compression springs 116 encircle the shanks of the U bolt and are supported between spring clips 117. The upper end of the rocking lever is pivoted to the tail piece 118 of a fork 119 by a bolt as shown in Figs. 1, 2 and 3. This fork supports the rear ends of two toggle links 120 the front ends of which are pivoted by pins to the rear straight portions 121 of the two curved compressor arms 122. These compressor arms are supported from the vertical bar 3 by yokes 123 provided with horizontal portions to the bottom surface of which the straight portions of the compressor arms are secured by bolts 124. These bolts pass through elongated openings in the horizontal portions of the yokes 123 to provide for the adjustment of the compressor arms which are secured by set screws, see Fig. 3. The yokes 123 have vertical openings formed therein through which the vertical bar 3 loosely passes, so as to permit the compressor arms to swing horizontally. The yokes are supported upon the bar 3 by a heavy split collar 126, which is clamped around the bar by a clamping bolt 127, and additionally supported by a vertical bolt 128 passed through the horizontal top plate 5. The pin 129 which pivots the ends of the links 120 to the fork 119, extends upward above the top of the fork for a short distance and the collar 126, has a comparatively long tail piece 130 formed integrally therewith and extending rearwardly therefrom. This tail piece curves downwardly for a short distance and then extends horizontally backward. This horizontal portion of the tail piece has a vertical slot formed therein in which the projecting portion of the pin 129 plays, see Figs. 1, 2 and 3. By this construction the direction of the movement of the pivoting point of the toggle links 120 is in a straight line back and forth and there is no wabbling from side to side or an uneven opening or closing of the compressor arms. The horizontal portion of each yoke 123 has a vertical lug 131 formed integral therewith and one end of a coiled spring 132 is secured to each of the lugs 131, as shown in Figs. 1 and 3. The purpose of this spring is to automatically return the compressor arms to their open or normal position upon the release of the toggle device.

The compressor arms do not themselves touch the barrel, but each compressor arm has a number of segmental plates pivoted thereto which plates come into contact with the barrel staves when the compressor arms are closed. In the preferred construction, four segmental plates are employed, two plates being pivoted to each compressor arm. Each segmental plate 133 has its inner edge curved to a circle which is of about the same radius as the body of the barrel which is to be operated upon. Each segmental plate has a laterally extending lug 134 which has a vertical opening 135 formed therein. This opening 135 is rectangular in shape and a block 136 having two parallel horizontal flanges 137 extending from its bottom edge, is fitted in the opening 135, see Fig. 3. The flanges 137 extend beneath the bottom surface of the lug 134 and thus support the segmental plate 133. A bolt 138 passes through the block 136 and through the compressor arm 122, and secures the block 136 and the segmental plate 133 to the compressor arm. A horizontal rod 139 has one end screwed into the block 136 and passes loosely through an opening in the lug 134 on the segmental plate 133. The rod 139 projects beyond the lug 134 for some distance and is encircled by a coiled spring 140; the spring being held in place by a washer and a nut screwed upon the outer end of the rod, see Fig. 3. This construction gives the segmental plate a certain range of movement against a spring cushion to adapt itself to the irregularities in the shape of the barrels. The compressor arms are released by a lever which is shifted by the operator to break the toggle.

The tail piece 130, has a laterally extending lug 141, and a hand lever 142 is pivoted near its rear extremity to the lug by a vertical bolt 143. The rear portion of this hand lever extends transversely across and directly beneath the tail piece. Beyond the pivoting bolt the hand lever curves and extends obliquely forward to within convenient reach of the operator. The front end of the hand lever has a handle 144 fastened thereto, see Figs. 1 and 2. The extreme rear end of the hand lever 142, is reduced slightly and lies adjacent to the pin 129 when the toggle is spread to compress the barrel. A lug 145 is formed upon one edge of the tail piece 130 and this lug has a pocket in which a coiled spring 146 is placed so as to bear against the lever 142, see Fig. 3. A depending lug 147 is formed on the bottom surface of the tail piece 130 to limit the forward movement of the transverse portion of the hand lever. The purpose of the spring 146 is to keep the lever pressed tightly against the depending lug 147.

The operation of the stave compressing mechanism is as follows:—The machine is started as before described and the cam 110 revolves with the main shaft 58. The cam operating against the roller 111 causes the upper end of the rocking lever to move inwardly carrying with it the fork 119. This causes the toggle links 120 to spread thereby spreading the rear ends of the compressor arms and causing the portions 122 of the arms to close around the barrel. When the barrel is fully compressed, the pin 129 is in the center; that is, the center of the pin is in a straight line drawn from center to center of the pins which pivot the toggle links 120 to the ends of the compressor arms, see Fig. 3, where this is plainly shown. The purpose of this is so that the compressor arms are automatically locked in their compressing position and cannot release themselves, but are released by the hand lever 142 at the will of the operator. When it is desired to release the compressor arms, the handle 144 is grasped by the operator and the lever 142, moved in a direction toward the barrel. This causes the extreme rear end of the lever to move toward the pin 129 and striking against it, to force it back beyond the center, when the tension of the coiled spring 132 causes the compressor arms to open, as shown in Fig. 1.

The spring cushions of the segmental arms provide for slight differences in the diameter of the barrels operated upon. Barrels of different sizes may be hooped and headed in this machine by substituting segmental plates 133, of different sizes. The yielding connection between the two members of the rocking lever which closes the compressor provides a further safety against the crushing of the barrel. When the compressor arms grip the barrel with a tension equal to that of the springs 116, these springs yield and prevent the crushing of the barrel. The springs are tensioned by the nuts screwed upon the shanks of the U bolt 115, see Fig. 5.

A device for assisting in disengaging the hook 100, from the clutch pins 97, is provided and is illustrated in Fig. 5. An arm 148, is pivoted to a lug extending from the vertical portion 55, of the bracket 53, adjacent to the cam 110. This arm carries a roller 149, which travels on the face of the cam and engages in a depression therein. A rod 150, has its lower end pivoted to the end of the arm 148, and extends diagonally upward and through a block 151, which is bolted to a lug 152, extending from one of the bearings 56, see Fig. 5. A coiled spring 153, encircles the rod and keeps the roller in engagement with the face of the cam. The action of this is as follows:—As the cam revolves, the roller drops into the deep depression in the cam and causes a slight back motion of the main shaft which permits the hook 100, to disengage itself from the clutch pin. It will be noted by reference to the drawings that the depression in the cam 110 in which the roller 149 seats is just beyond the point of maximum throw, so that this point will have passed the roller 111 on the rocking lever before it reaches the roller 149. As the compressor arms are instantly locked against opening movement the moment the point of maximum throw on the cam 110 reaches the roller 111, owing to the straightening of the toggle levers, as heretofore described, the rocking lever is held in this position so that its roller 111 does not seat in the depression in the cam. Thus any back movement or jumping of the rocking lever which would tend to disturb the compressor arms and loosen their hold on the barrel is absolutely prevented.

The horizontal top plate 5, supported at the upper ends of the bars 3 and 7, serves as a shelf upon which the hammer and nails used to secure the heads in the barrels are conveniently placed.

The operation of the machine is as follows:—The operator places a barrel upon which the two bilge hoops have already been driven in position in the machine as shown in Figs. 1 and 2. The expansible head holding ring is then placed upon the expanding table, as shown in Figs. 11 and 13, and the foot lever 18, depressed into the position shown in dotted lines in Fig. 22. This movement of the foot lever raises the bar 44, within the hollow standard 10, of the expanding table, and by means of the links 45, moves the slidable sectors 39, comprising the table in radial directions from the center, thereby enlarging its diameter and expanding the head holding ring, see Figs. 12 and 14. The operator now lifts the sections of a barrel head from the top of the stack of heading 16, and places them upon the expanding table within the expansible head holding ring and releases the foot lever 18. The weighted bar 44, descends and returns the foot lever to its normal position, see full lines in Fig. 22, and also draws the slidable sectors 39, toward the center until they regain their normal position, see Fig. 8. As the sectors move inwardly they permit the expansible ring to contract around the barrel head and tightly clamp the pieces thereof together. As heretofore described, the downward movement of the foot lever 18, raises the toothed bar 14, by means of the lever 17, and dog 19, so that the stack of heading is elevated a distance about equal to the thickness of a head. This vertical feed maintains the top head of the stack within convenient reach of the operator as he stands before the expanding table. The mechanism of the machine is now in the position shown in Figs. 1 and 8. The operator lifts the expansible head holding ring from the expanding table using the circular springs 35, as handles, and places it upon the top edge of the barrel as shown in Figs. 2, 23 and 24, the ring being supported by the lugs 38. The head driving ring 96, is taken from the shelf 53, and placed upon the head within the expansible ring, (Fig. 2). The lever 88, is now drawn downward to swing the bracket 83, on its pivoting rod 84, so as to grip the friction board 86, which depends from the arm 66, between the rollers 77 and 80, and thus draw down the arm 66, and with it the head driving plate 65. The driving plate 65, descends with sufficient force so that when it strikes the ring 96, it drives the head through the expansible holding ring into the end of the barrel where it is caught by the croze in the staves, Fig. 24. When the head is passing through the expansible ring into the barrel, the barrel staves spring outward sufficiently to enable the head to enter, and then contact again to grip the head. When the head has been driven into the barrel, the operator releases the lever 88, which permits the friction rollers 77 and 80, to separate and the springs 75, to elevate the plate 65, and arm 66, out of proximity to the barrel. The driving ring 96, and the expansible head holding ring are now removed from the barrel.

The next operation is to drive on the end hoop. The operator steps upon the front end of the foot lever 107, and thereby withdraws the sliding rod 105, from the engagement with the lug 103, on the hook 100. This permits the hook to engage the clutch pins on the large spur gear 59, and starts the main shaft 58, as heretofore described. As the shaft 58, revolves, the cam 110, engages the roller 111, and rocks the rocking lever on the rock shaft 112. This lever spreads the toggle connection at the rear ends of the compressor arms and closes the compressor arm around the barrel which is embraced by the segmental plates 133, as heretofore described and as shown in Fig. 3. The segmental plates embrace and compress the barrel staves so closely that the head is forced from the position shown in Fig. 24, into the croze and tightly wedged. The operator now places a hoop of proper diameter over the end of the barrel and grasping the lever 88, pulls it down so as to grip the friction board 86, between the rollers 77 and 80, and cause the driving plate 65, and arm 66, to descend, in the manner heretofore described. The descending driving plate strikes the hoop and drives it upon the barrel until it is flush with the edge thereof. When the hoop is driven home, the operator grasps the head lever 142, and moves it toward the barrel thereby breaking the toggle and permitting the compressor arms to open. This completes the operation. The barrel is removed, another is placed in position and the operation is repeated.

I claim as my invention—

1. In a barrel heading up machine, the combination with the heading up mechanism, of a heading feeder consisting of a vertically movable heading support and an expanding table for expanding a holding ring for supporting head parts in assembled position.

2. In combination an expansible barrel head holder ring and means for expanding said ring consisting of a table having a series of movable sections upon which a barrel head is supported and around the edges of which the ring is placed.

3. In combination an expansible barrel head holder ring, means for expanding said ring comprising a table composed of a plurality of radially movable sections and means upon which a barrel head is supported and around which the ring is placed separating the sections to expand the ring.

4. In combination an expansible head holder ring, means for expanding said ring comprising a table composed of a plurality of movable sections and means for fitting the parts of a head in said ring while expanded.

EDWIN F. BEUGLER.

Witnesses:
L. M. SANGSTER,
GEORGE A. NEUBAUER.